United States Patent [19]

Follin et al.

[11] 4,190,818
[45] Feb. 26, 1980

[54] DIGITAL BEAMSTEERING FOR A PARAMETRIC SCANNING SONAR SYSTEM

[75] Inventors: James W. Follin, Rockville; Robert E. Miller, Ellicott City, both of Md.

[73] Assignee: The United States of America as represented by the Secretary of the Navy, Washington, D.C.

[21] Appl. No.: 827,652

[22] Filed: Aug. 25, 1977

[51] Int. Cl.² ............................................. G01S 9/66
[52] U.S. Cl. ........................... 367/138; 343/100 SA; 367/92
[58] Field of Search .................. 340/1 R (U.S. only), 340/3 A (U.S. only), 3 R (U.S. only), 3 PS; 343/100 SA (U.S. only)

[56] References Cited

U.S. PATENT DOCUMENTS

| | | | |
|---|---|---|---|
| 3,723,955 | 3/1973 | Lyons et al. | 340/3 A |
| 3,763,463 | 10/1973 | Muir | 340/1 R |
| 3,824,531 | 7/1974 | Walsh | 340/3 R |
| 3,964,013 | 6/1976 | Konrad | 340/3 A |
| 4,001,763 | 1/1977 | van Heyningen | 343/100 SA |
| 4,058,003 | 11/1977 | Macovski | 340/1 R |

Primary Examiner—Richard A. Farley
Attorney, Agent, or Firm—R. S. Sciascia; A. L. Branning

[57] ABSTRACT

Digital beamsteering for a parametric scanning sonar steers a nonlinear, modulated signal of a single high frequency by appropriately delaying and/or varying the phase of the signal as it enters each of a plurality of elements in an array. The sonar beam can be steered electronically over a wide range of angles.

24 Claims, 20 Drawing Figures

WHEN PHASE SELECT IS NEGATIVE
 1. A < C YIELDS POSITIVE DRIVE SIGNAL
 2. C < B YIELDS NEGATIVE DRIVE SIGNAL

WHEN PHASE SELECT IS POSITIVE
 1. C < B YIELDS POSITIVE DRIVE SIGNAL
 2. A < C YIELDS NEGATIVE DRIVE SIGNAL

| BIT / WORD | $2^{11}$ | $2^{10}$ | $2^9$ | $2^8$ | $2^7$ | $2^6$ | $2^5$ | $2^4$ | $2^3$ | $2^2$ | $2^1$ | $2^0$ |
|---|---|---|---|---|---|---|---|---|---|---|---|---|
| 0 | | | | | ←── ROLL POSITION ──→ | | | | | | | |
| 1 | ←── ROLL RATE ──→ | | | | | | | x | x | x | | |
| 2 | | | | | ←── MOD FREQUENCY ──→ | | | | ←── PITCH ──→ | | | |
| 3 | ←── MOD RATE ──→ | | | | | | ←── PRF ──→ | | ←── PW ──→ | | | |
| 4 | | | | | ←── RANGE GATE ──→ | | | | | | | |

DIGITAL BEAMSTEERING FOR A PARAMETRIC SCANNING SONAR SYSTEM

BACKGROUND OF THE INVENTION

A parametric, or nonlinear, sonar utilizes the nonlinear compressibility of water to generate a narrow sonar beam having unusually low sidelobes. In the prior art systems, two intense high-frequency beams are transmitted simultaneously into the water where they interact nonlinearly to produce sum-frequency and difference-frequency waves. The "sum" wave dominates the pressure field in the water over short ranges; the "difference-frequency" wave survives over long ranges because the two primary sine waves, and especially the "sum" wave, attenuate rapidly with distance. "Difference-frequency" wave effects resulting from the system transducer array or electronics, however, are undesirable where a narrow nonlinear beam is sought because such effects lead to broad beam pattern radiation.

This problem has been addressed by prior art systems which have carefully summed and amplified the constituent signals before entering the "sum" wave component signals into a transducer. However, the cost of including a linear amplifier which screens out the "difference-frequency wave, the space it requires, and the possibility of the difference frequency being generated, nonetheless, thereby masking the narrow beam, make the prior art parametric sonar systems less than optimal.

U.S. Pat. Nos. 3,924,259 and 3,824,531 represent prior art apparatuses which combine two signals in order to produce sonar energy at a "...resultant frequency equal to an arithmetic combination of the radiated frequencies..." of the two signals. Once formed, the composite signal enters various elements, including a clipping circuit, which convert the combined analog signal into digital form. The digitizing makes the composite signal compatible with digital multiplexing switches and computer commands found in subsequent beamsteering stages. The commands from the computer are designed to delay the respective outputs from each of a plurality of arrays in order to form a beam generated at the resultant frequency. The large amount of equipment required to generate, amplify, and compute the required delay represents a significant disadvantage in such prior art systems.

In U.S. Pat. Nos. 3,697,994 and 3,683,386 beamsteering systems employing a digital computer, together with interconnected adders, are taught. The apparatuses disclosed therein control the radiations of energy from array elements in a transducer by use of phase information only. Using phase only (and not time), sufficient information to steer a sonar beam where ensonified regions are spaced at distances comparable to the wavelength of the sonar signal is not provided. The digital phase shifting techniques of these references have been less than optimal in certain applications.

SUMMARY OF THE INVENTION

In order to overcome the shortcomings found in prior art parametric sonar systems, the present invention achieves beamsteering by switching a single frequency drive signal on and off to simulate the effect of combining two high-frequency signals. Further, the invention delays the signals produced at various array elements as a function of time. Two shift registers with differing adjustable clock frequencies are meshed together to produce the proper time-dependent delay at each element in the array.

By using the one drive signal, the need for linear amplifiers which eliminate the difference frequency generated during the signal mixing found in the prior art is obviated. The single drive signal is simply modulated by switching the power amplifiers on and off to permit pulses of varying widths to be generated.

The modulation of the one high-frequency signal can be made to simulate the effect of the generated composite signal of the prior art when the following mathematical identity, i.e. that an amplitude modulated sine wave is equal to the sum of two sine waves, is recalled:

$$\cos \omega_m t \cos \omega_o t = \tfrac{1}{2}[\cos(\omega_o+\omega_m)t + \cos(\omega_o-\omega_m)t]$$

The final drive waveform applied to the output transducer is identical for both the conventional and the present techniques. However, the implementation according to the present invention is considerably simpler. Instead of having to steer two signals as is shown in the prior art, the present invention steers only the single high-frequency drive signal.

Further, by using digital electronics, the invention contemplates the packaging of power amplifiers and console electronics with the array itself rather than at a remote, surface location.

Also, according to the present invention, a square wave is used for the high-frequency drive signal so that it could be readily represented digitally as a series of 1's and 0's. Pulse width or pulse duration modulation (PDM) was selected to define the drive signal from among other forms of pulse modulation (including the modulation of a sine wave with a square wave and pulse amplitude modulation), which may also be used, to facilitate the use of digital logic. The aforementioned alternatives to PDM generate higher harmonics which may lead to additional noise and, in any case, produce an acoustic intensity $4/\pi$ times the intensity resulting from the modulation of one sine wave by another. PDM more closely approximates pure sine wave modulation, decreasing the production of undesirable higher harmonics.

As is customary in pulse width modulation, the switching of power amplifiers creates a duty cycle which represents the on time:off time ratio of the drive signal. The resultant duty cycle determines the distribution of sound energy in the water. By properly varying the duty cycle, the sound energy, or spatial pattern of sound intensity, generated can be made to approximate that which would be obtained by conventional amplitude modulation techniques.

The actual steering of the beam is achieved by passing the generated PDM drive signal through a two-dimensional matrix of shift registers controlled by two variable-frequency clocks. The phase of the drive signal differs at each port of the shift register matrix according to the respective time delay imposed by the clocks. The delayed signals from each port of the shift register matrix are further processed and applied to corresponding elements of the array.

As previously suggested, the two-level waveform of the drive signal makes the digital implementation of this time-delay matrix relatively simple; the design of such a matrix to handle an analog waveform would, to the contrary, have been quite a formidable task.

Also, time-delay beamsteering has the additional advantage that all frequencies embodied in the drive waveform are steered to the same angle. Steering angle, in other words, is not dependent on drive signal frequency. Such is not the case in the cited, conventional phase-shift (phase information only) beamsteering matrices.

The present beamsteering system provides an almost completely digital method for steering a generated signal with simplified, less-expensive, more compact apparatus. It is, of course, within the scope of the invention, because of its digital character, to combine a microprocessor with the invention in evaluating some of the control functions found in the invention.

In addition to the above advantages, the present system maintains a low sidelobe level while having the capability of beamsteering to angles in excess of 45°. In accordance with the present system, primary beams can be steered in fine increments between ±60° without appreciable signal degradation.

BRIEF DESCRIPTION OF THE DRAWINGS

FIG. 1, made up of 1a and 1b, is a block diagram of the general elements of the invention;

DESCRIPTION OF THE PREFERRED EMBODIMENT

The present invention performs two functions. First, a single high-frequency signal is, in digital form, PDM modulated to correspond to a desired sonar energy pattern. And, second, the sonar energy is steered by digitally switching the modulated signal at different times at different locations in a transducer array. The following description of the invention discusses an apparatus and method employed in achieving these functions.

General Description

Figure 1A:
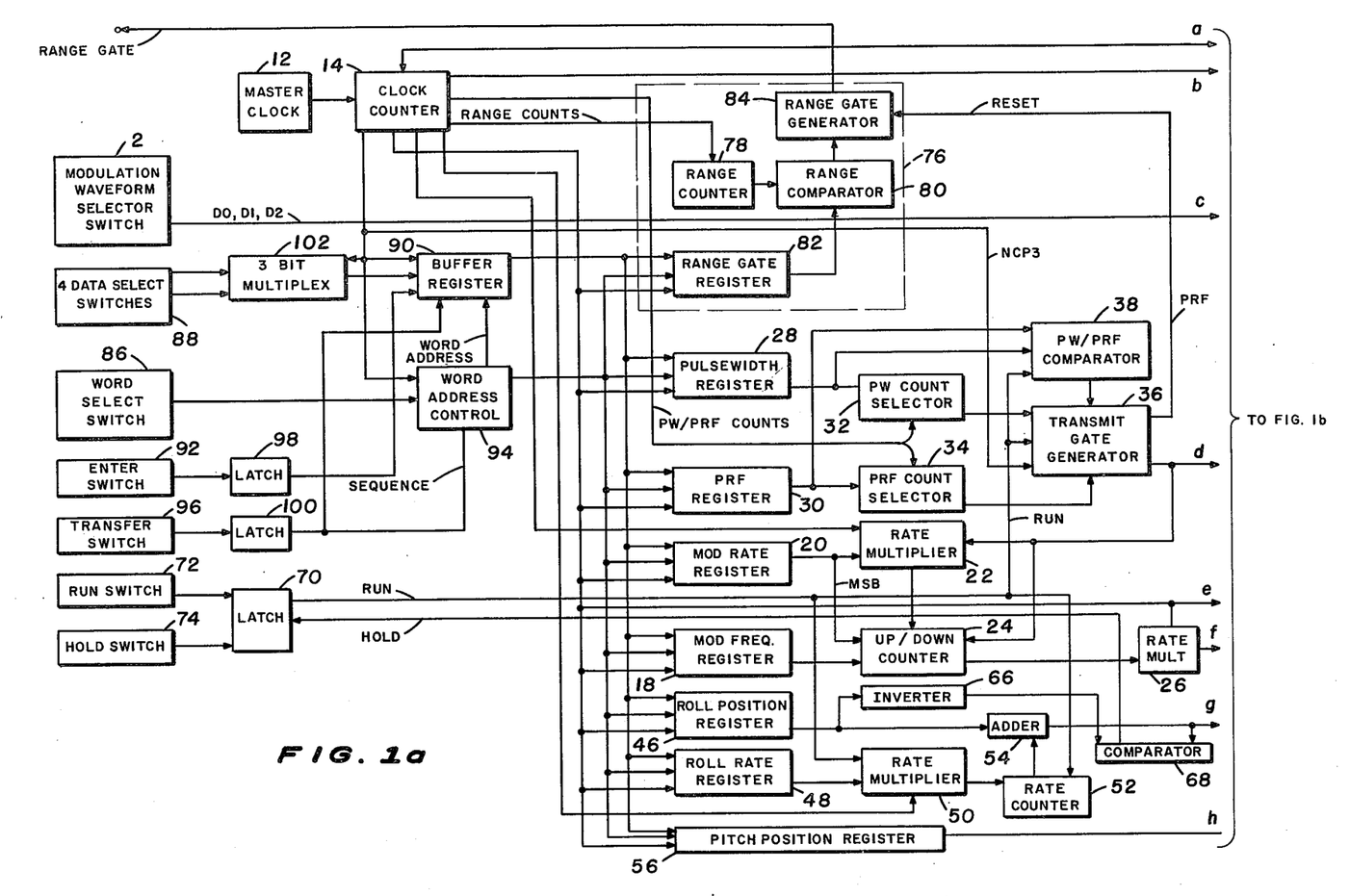
Figure 1B:
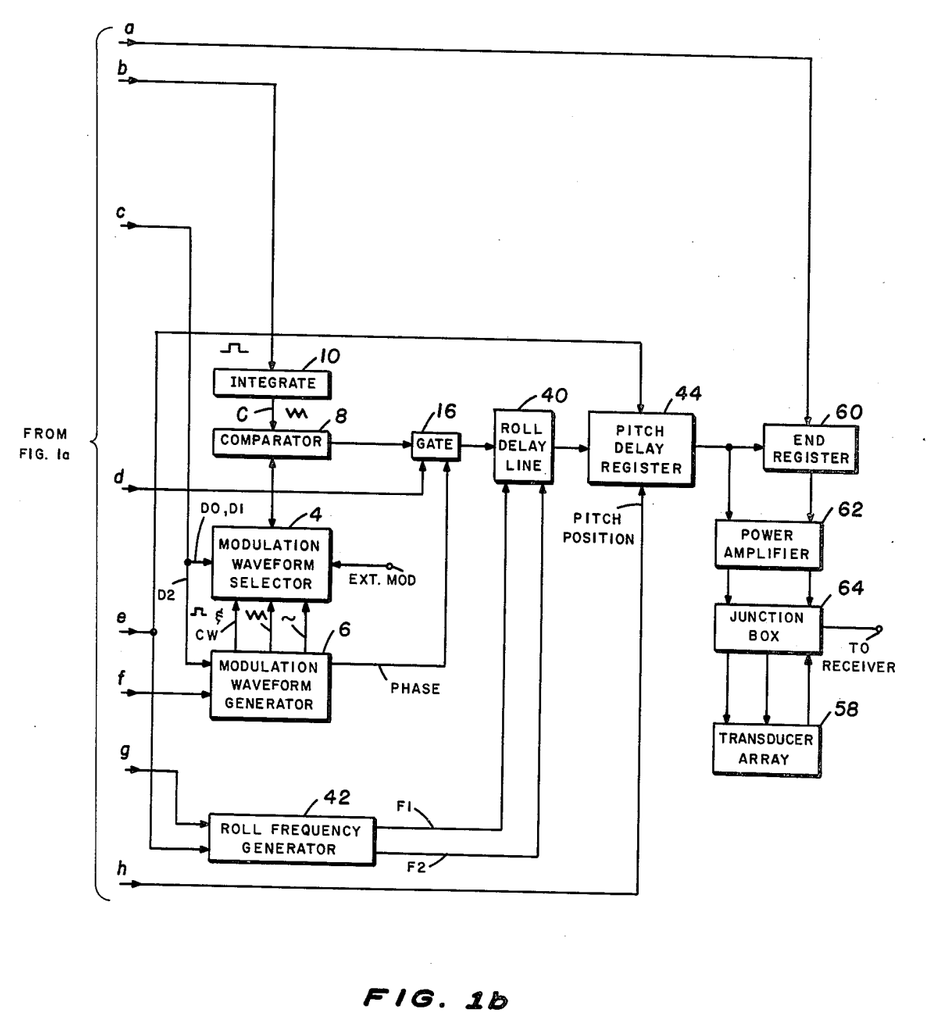

FIG. 1 illustrates the various controls and internal elements of the invention. In the upper left portion of FIG. 1a is a modulation waveform selector switch 2, which defines a 3-bit codeword corresponding to the modulation waveform desired (triangular, sinusoidal, square, external). The switch positions control three signals; D0, D1, D2. D0 and D1, which enter a modulation waveform selector 4 (FIG. 1b) are employed to select one of the four modulation forms (triangle, sine, square, external) produced in and put out by a modulation waveform generator 6. To obtain a CW waveform, D2 is added to the square wave code. The selected modulation waveform then enters a comparator stage 8. The other input to the comparator stage 8 is a triangular, carrier frequency signal emanating from an integrator 10. Pulses which feed the integrator 10 originate at a master clock 12 (FIG. 1a) and are multiplied to the desired frequency in a clock counter 14. Example inputs to the comparator stages 8 are shown in FIG. 2.

Figure 2:
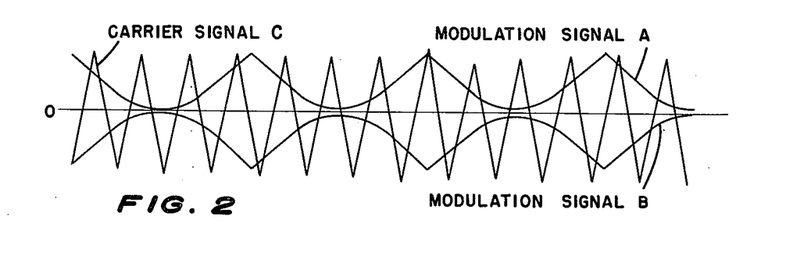
FIG. 2 shows the carrier and modulation signals generated by the invention.
Figure 3:
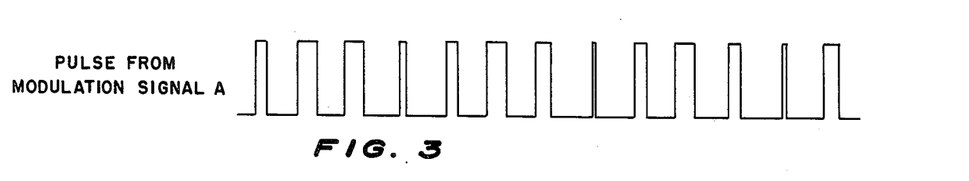
FIGS. 3 and 4 show the resultant output of combining the carrier with each modulation signal, respectively.
Figure 4:
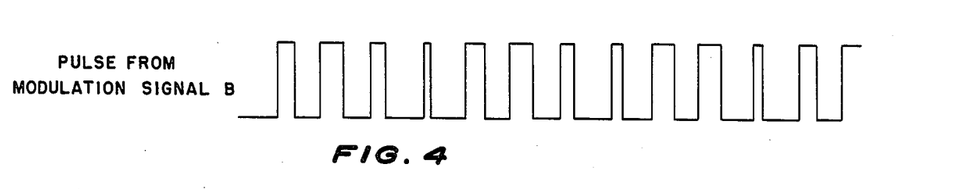

The waveform generated in the example shown in FIG. 2 comprises two component signals A and B having equal, but opposite, magnitude. Each component A and B is compared to carrier signal C in a separator comparator (not shown) in the comparator stage 8 to produce the pulse outputs shown in FIGS. 3 and 4. In FIG. 3 a pulse is generated as long as the carrier C exceeds the modulation signal A (A<C). Similarly, a pulse is shown in FIG. 4 when modulation signal B exceeds the carrier C (C<B).

Figure 5:
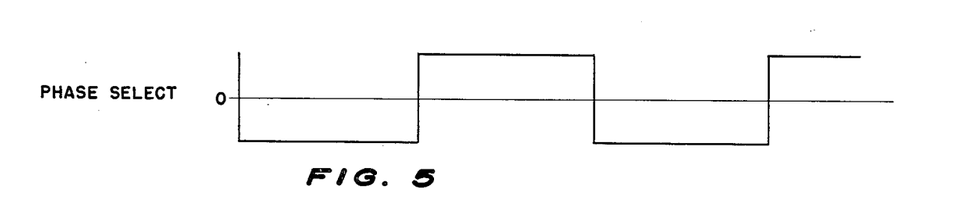
FIG. 5 shows a phase select signal generated by the invention.
Figure 6:
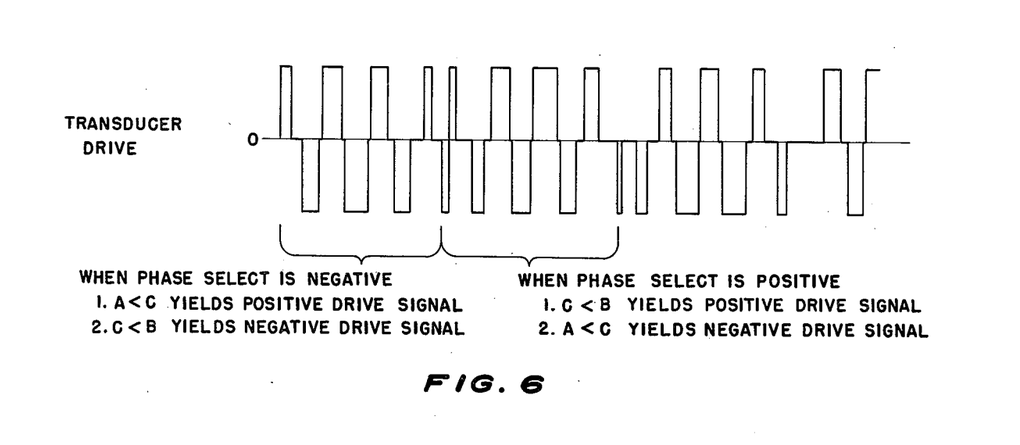
FIG. 6 shows an ideal final output drive waveform achievable with a dual channel embodiment, derived by alternately selecting the resultant outputs of FIGS. 3 and 4 depending on the state of the phase select.

A gate 16, shown in FIG. 1b, has a phase select input determined by the modulation waveform generator 6 to have a frequency equal to the modulation signal frequency. The phase select input switches between positive and negative as shown in FIG. 5. When negative, the phase select input causes the gate 16 to produce a positive pulse when A<C and a negative pulse when C<B. Inversely, when the phase select input is positive, the gate 16 generates a positive pulse when C<B and a negative pulse when A<C. The composite equivalent output from the gate 16 is shown in FIG. 6. The gate 16 output is the ideal drive signal of a two channel embodiment of the system. The energy pattern of the drive signal can, of course, be altered by either changing the carrier frequency, the modulation waveform selected, the modulation waveform frequency, or the duty cycle of the signal.

These listed drive signal variants are represented by registers which contain data words that define the characteristics of the waveform. Varying the modulation waveform is accomplished by changing the contents of a modulation frequency register 18 and a modulation rate register 20 of (FIG. 1a). The original frequency of the waveform is set in the modulation frequency register 18 and is changed at the rate set in the modulation rate register 20. Thus, altering the initial frequency or altering the rate at which the frequency changes can be accomplished by varying the digital contents of the appropriate register. This altering is processed by a rate multiplier 22 which receives the modulation rate as an input and clocks an up/down counter 25. The up/down counter 24 initialized itself by inputting the contents of the modulation frequency register 18 and adjusts the frequency in accordance with the entered modulation rate. The most significant bit (MSB) of the modulation rate code indicates whether the modulation frequency should be increased or decreased. A current modulation frequency is continuously produced. The current modulation frequency is converted into pulses by a rate multiplier 26 which is clocked by the clock counter 14. These pulses enter the modulation waveform generator 6 (of FIG. 1b) to determine the instantaneous frequency of the selected waveform.

Figure 7:
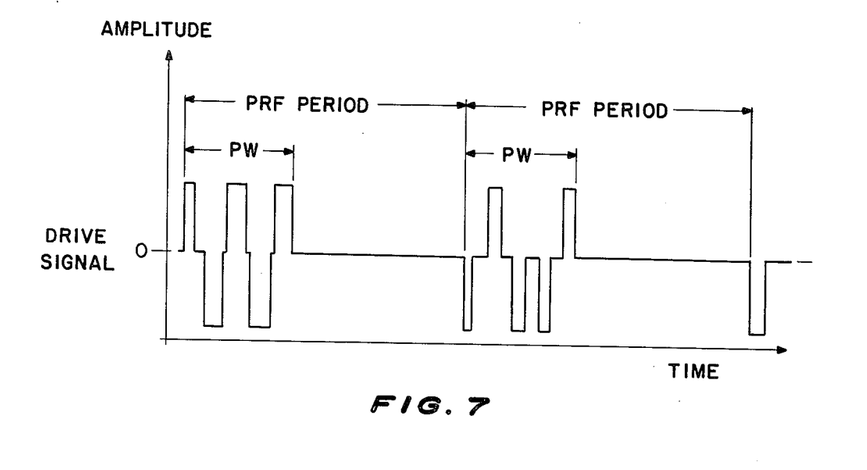
FIG. 7 shows the gating of the drive signal of the present invention to achieve the desired sonar energy pattern.

To achieve a change in the duty cycle of the transmitted waveform, a pulsewidth register 28 and a pulse repetition frequency (PRF) register 30 are provided (see FIG. 1a). The pulsewidth register 28 contents indicate the duration of the gating of the drive signal during a transmission period, while the PRF register 30 contents set the length of the transmission period. FIG. 7 indicates the relationship between pulsewidth and PRF with respect to the modulation signal of the invention. Connected to the registers (in FIG. 1a) is a respective pulsewidth (PW) count selector 32 and a PRF count selector 34, both of which accumulate count inputs received from the clock counter 14. The outputs from the PW count selector 32 and the PRF count selector 34 enter a transmit gate generator 36. To prevent the possibility of a pulsewidth exceeding a PRF period (i.e. a duty cycle greater than 100%), a PW/PRF comparator 38 is included to inhibit the transmit gate generator 36 in such instances. The "duty cycle" output gate from the transmit gate generator 36 enters the gate 16 (of FIG. 1b) as well as the rate multiplier 22 and the up/down counter 24 (of FIG. 1a). The changing of either the PW or PRF values effects a change in the duty cycle and hence the sonar energy pattern, i.e. ensonification pattern.

The drive signal shown in FIG. 6 can be used to produce a desired underwater sonar pattern because of the non-linear nature of the signal in the water.

Referring back to FIG. 1b, the drive signal from the gate 16 enters the roll beamsteering and pitch beamsteering elements indicated as a roll delay line 40, receiving inputs from a roll frequency generator 42, and pitch delay registers 44. The roll frequency generator 42 is pulsed by the clock counter 14 and controlled by the values contained in a roll position register 46 and a roll rate register 48 (see FIG. 1a).

As suggested by its label the roll position register 46 contains a data word which represents the roll angle (in degrees), according to the equation:

$$\text{Roll position} \approx \sin^{-1}\left\{ \frac{1}{4f_o} \left[ \frac{4096}{\alpha_1} - \frac{1}{1 - \alpha_1/4096} \right] \frac{s}{d} \right\}$$

where $\alpha_1 = 1, 2, 3, \ldots, 4095$ is a roll position control value, $f_o$ is the frequency of the carrier C, s is the speed of sound in water, and d is the displacement between elements in the roll plane. Similarly, roll rate is represented by a data word defined as:

$$\text{Roll rate (degrees/minute)} \approx \left( \frac{60}{16,584} \right) \left( \frac{f_o}{\beta_2} \right) (\alpha_2)$$

where $\alpha_2 = 0, 1, 2, \ldots, 63$ is the roll rate control value and $\beta_2$ is the number of counts per degree. $\beta_2$ is determined from the equation for roll position by solving for the $\alpha_1$ corresponding to 0° and 45°, respectively, and calculating from those values of $\alpha_1$, the average number of counts per degree. The data word in the roll rate working register 48 enters a rate multiplier 50 which clocks out the roll rate data word as corresponding pulses at a speed determined by the clock counter 14. A rate counter 52 accumulates the counts at approximately the clocking rate derived from the clock counter 14. The roll rate count, or the speed at which roll is changing, is added to the roll position in an adder 54 to produce a current roll position. The current roll position comprises a data word which enters the roll frequency generator 42 to effect a desired clocking scheme in the roll delay line 40. Pitch is steered by means of the pitch delay registers 44 which are clocked off the clock counter 14 and are controlled by a pitch position data word stored in a pitch position register 56.

Figure 8:
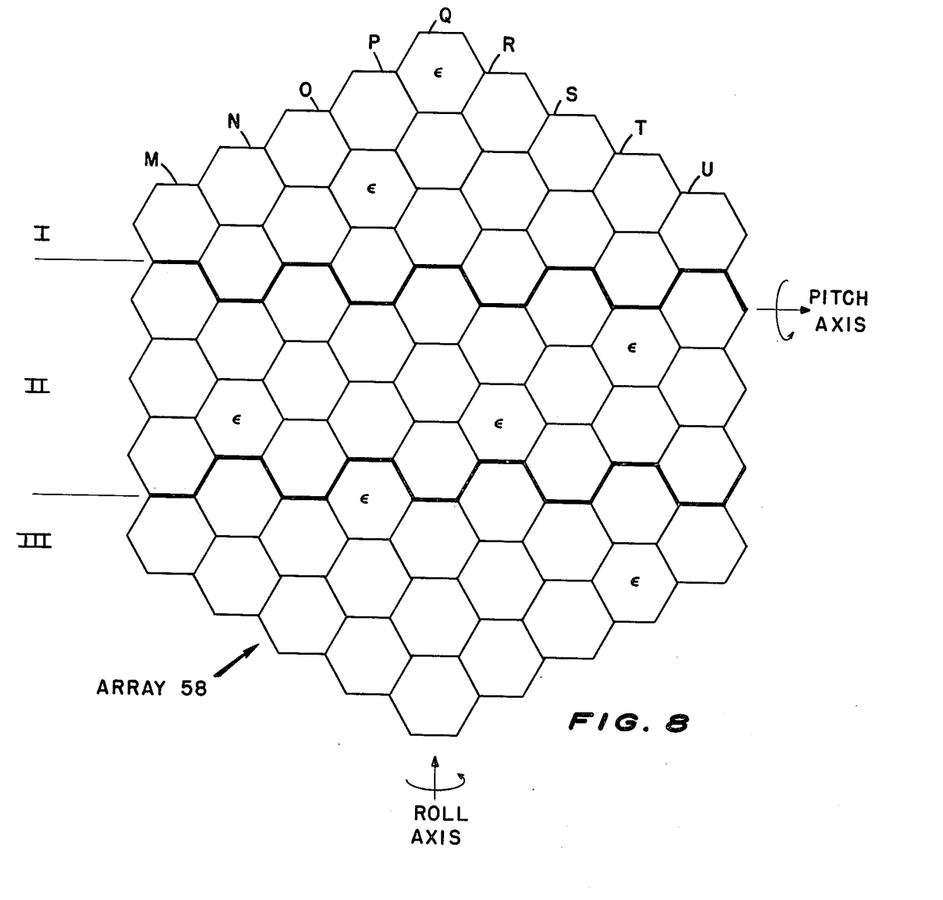
FIG. 8 is a diagram of an array element transducer driven by the present invention.

Examining a transducer array 58, having a plurality of elements $\epsilon$ as shown in FIG. 8, it is apparent that delaying the drive signal in successive vertical columns will effect a roll. In like fashion, delaying succeeding horizontal rows will effect a steering about the pitch axis. Looking back to FIG. 1b, it can be seen that the elements $\epsilon$ (not shown) of array 58 are delayed to effect roll steering and then delayed again to effect pitch steering. The twice delayed signal enters an end register 60 which is clocked off the clock counter 14. Digital data from the end register 60 is boosted by a power amplifier 62 which sends the properly delayed signal to the array 58 through a junction box 64. The junction box 64 serves to separate signals which are to be transmitted by the array 58 from signals received by the array 58 for further processing by a receiver unit (not shown).

In roll beamsteering, the beam is initially aimed in one direction, and in steps determined by the roll rate, scans in increments until it reaches a selected angular limit, at which point the scan stops. This function is performed (see FIG. 1a) by inverting the contents of the roll position register 46 in an inverter 66 and comparing, in a comparator 68, the inverted value and the current roll position put out by the adder 54. In this way, if the stored roll position is −40°, the inverter 66 will produce an output reading +40°. The −40° will be incremented in the adder 54, based on the roll rate contained in the roll rate register 48. When the current roll position increments to +40°, the comparator 68 will introduce a "hold" output signal into a latch 70 which discontinues the scan sweep. Latch 70 is connected to a manual run switch 72 and a manual hold switch 74. The run switch 72, when activated, turns on the PW/PRF comparator 38, the transmit gate generator 36, the rate multiplier 50 (connected to the roll rate register 48), and the rate counter 52. The run switch 72 controls the transmitting of drive signals and the roll beam-steering.

In order to examine a range window of interest a range gate element 76 is provided. Pulses derived from the clock counter 14 enter a range counter 78, the contents of which are compared, in a range comparator 80, with the stored contents of a range gate register 82. When the range count equals the stored range value, the range gate generator 84 indicates that the range of interest has been reached.

The remaining elements shown in FIG. 1a are used in entering new data word values into the various registers—properly addressing, timing, multiplexing, and buffering them. This control data is entered by selecting a word on a word select switch 86 and four octal (or twelve bits of) data numbers (i.e. an input word) onto a data select switch 88. The new input word is clocked into a buffer register 80. When an enter switch 92 is activated the proper register, or similar type memory unit, is switched to the "write" mode and the input data for the four octal data characters determined by the data select switch 88 is entered into the proper, selected word register. Which word is entered into which register is controlled by a word address control 94.

To enter a new set of input words* to all the data word registers, a transfer switch 96 is provided. When activated, the transfer switch 96 causes the buffer register 90 to lock into a "read" mode. With timing clocks from the clock counter 14, the buffer register 90 and word address control 94 cause the words of input data to enter the appropriate registers in sequence. As each data word is entered a word count in the word address control 94 is incremented, resulting in a new word address being communicated to the buffer register 90 until all data word registers are up-dated. The enter switch 92 and transfer switch 96 are latched by latches 98 and 100, respectively.

Figure 9:
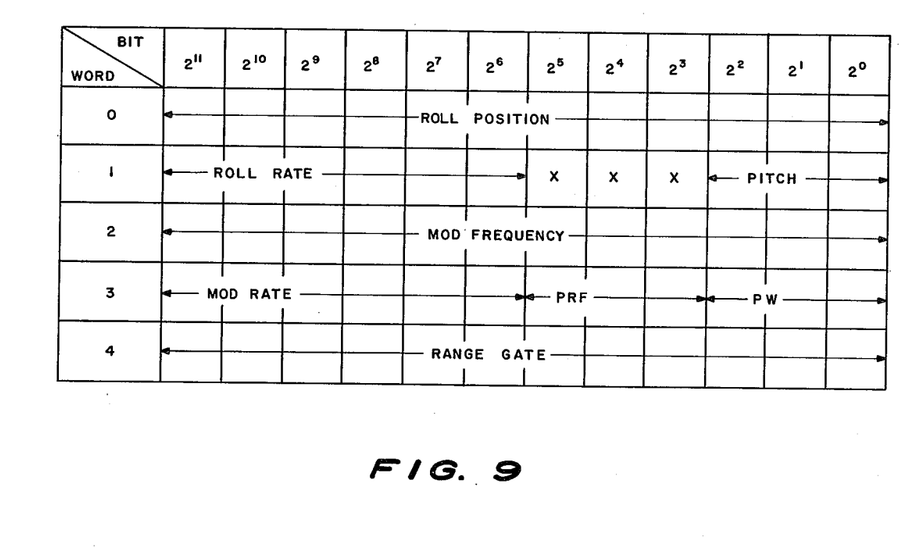
FIG. 9 is an illustration of a data word format which can be used with the present invention.

*See FIG. 9 for a sample illustration of the data word format. A multiplexer 102 is required in this sample format to properly channel data into appropriate portions of the buffer register 90 memory.

Modulation Waveform Generation

Figure 10:
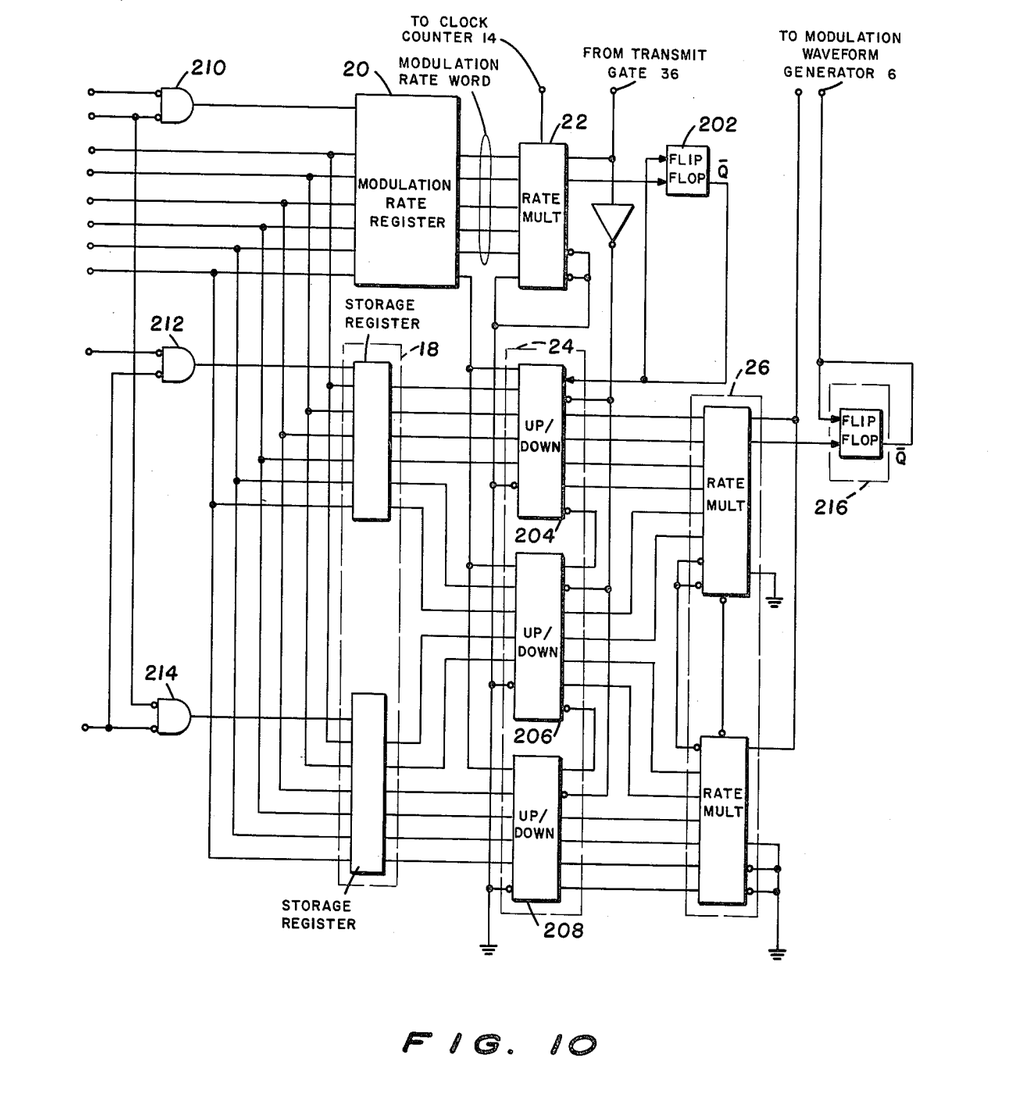
FIGS. 10 and 11a and 11b, are circuit diagrams showing the elements used in generating a desired modulation signal in a single channel embodiment.

The modulation frequency word, as seen in FIG. 9, is twelve bits in the sample format while the modulation rate word is six bits. Referring to FIG. 10, five of the six bits of the modulation rate word are shown applied to the rate multiplier 22 (also in FIG. 1) which is clocked off the clock counter 14 (of FIG. 1) at a nominal frequency, such as 5kHz. The output, which is divided down from the clock frequency in accordance with the input code, is again divided by two in a flip-flop 202. The $\overline{Q}$ output of the flip-flop 202 is applied as the clock input to a series of 4-bit up/down counter elements 204, 206, and 208 (which comprise the up/down counter 24 of FIG. 1).

The 12-bit modulation frequency word is applied to the inputs of the up/down counter elements 204, 206, and 208 from the modulation frequency register 18 (now shown in detail) and modulation rate register 20 (also shown in detail) by means of appropriate gates 210, 212, and 214. During the time between transmissions, the transmit gate 36 output (of FIG. 1) clears the rate multiplier 22 (also shown in FIG. 1) and loads the stored code into the up/down counter elements 204, 206, and 208. The code is then entered into two cascaded 6-bit rate multipliers 26 (labelled rate multiplier in FIG. 1) which are clocked by the clock counter 14 of FIG. 1. The resulting output is divided by 2 in flip-flop to provide a modulation frequency pulse to the modulation waveform generator 6 (of FIG. 1).

Figure 11A:
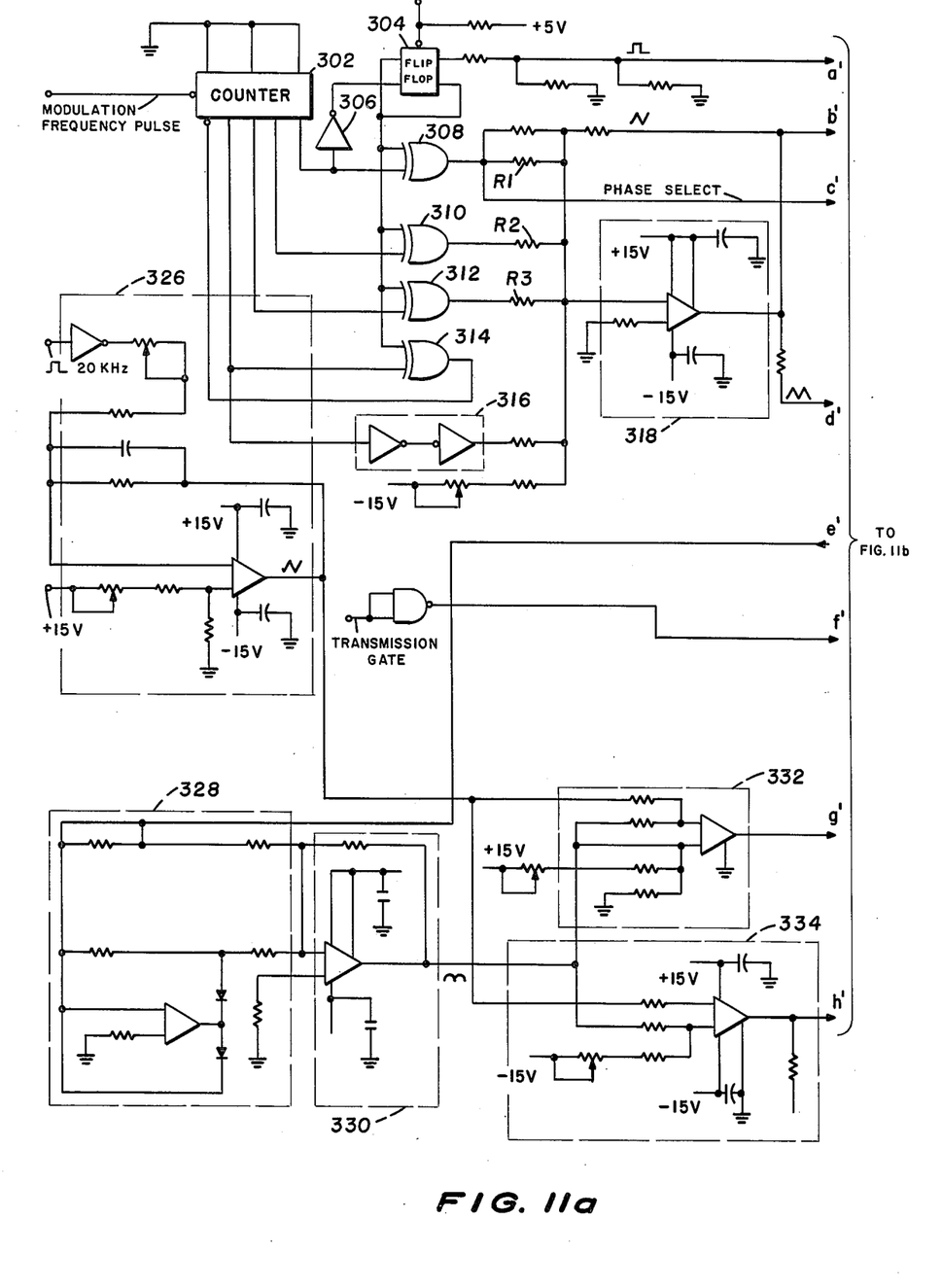

Referring now to FIG. 11a, the modulation frequency pulse provides the clock for a 4-bit counter 302 connected to a flip-flop 304 via gate 306 and four gates 308 through 314 and a buffer delay element 316 which together form an up/down counter. The output from the flip-flop 304 provides a square wave modulation waveform. The outputs from gates 308, 310, and 312 are applied through summing resistors $R_1$, $R_2$ and $R_3$ to an operational amplifier circuit 318. The operational amplifier 318 generates a stepped equivalent of a triangular waveform as shown. The triangular output enters a second operational amplifier 320 having several feedback circuits 322 (FIG. 11b) to provide amplifier gain inversely proportional to the input voltage. The output from op amp 320 simulates a sine wave as indicated in the figure. The three waveforms (square, triangle, and sine) and an external modulation signal enter a programmable 4-channel operational amplifier 324. The desired waveform is selected by switching the modulation waveform selector switch 2 of FIG. 1.

In the preferred embodiment, 20 kHz square pulses from the clock counter 14 (of FIG. 1) enter an integrator circuit 326 (see FIG. 11a) to produce a 20 kHz triangular carrier frequency (shown also in FIG. 2 as Carrier Waveform C). The modulation waveform from operational amplifier 324 (of FIG. 11b) is then rectified by two operational amplifier circuits 328 and 330 of FIG. 11a (see modulation signal A of FIG. 2). That is, the negative half of each cycle is inverted and then combined with the positive half. This signal is then compared to the triangular carrier frequency in two voltage comparator circuits 332 and 334. An AND-/OR/INVERT gate 336 (FIG. 11b) selectively passes one (i.e. signal A pulse of FIG. 3) and then the other (i.e. signal B pulse of FIG. 4) comparator pulse signal in response to the phase select signal from gate 308 (FIG. 11a) which is channelled through gate network 338 (of FIG. 11b). AND/OR/INVERT gate 336 produces two outputs; one (referred to as UP in FIG. 11b) represents the upper (positive) portion of the transducer drive signal of FIG. 6 while the other (labelled DOWN) carries the lower portion of the transducer drive signal. The UP and DOWN outputs can be combined in network 339 to produce a composite signal as shown in FIG. 6. The output of network 339 is monitored as an operational check.

In a two channel embodiment the UP and DOWN signals are (as shown in the alternative embodiment of FIG. 11c) separately processed in separate, parallel roll shift registers 346 and 348, the outputs from each entering separate pitch steering registers 350 and 352 and amplifiers 354 and 356 before being combined in a push-pull arrangement using a transformer 358 to activate the elements $\epsilon$ of transducer array 58. In this two channel alternative embodiment, no end register 60 as shown in FIG. 1b is required.

Figure 11B:
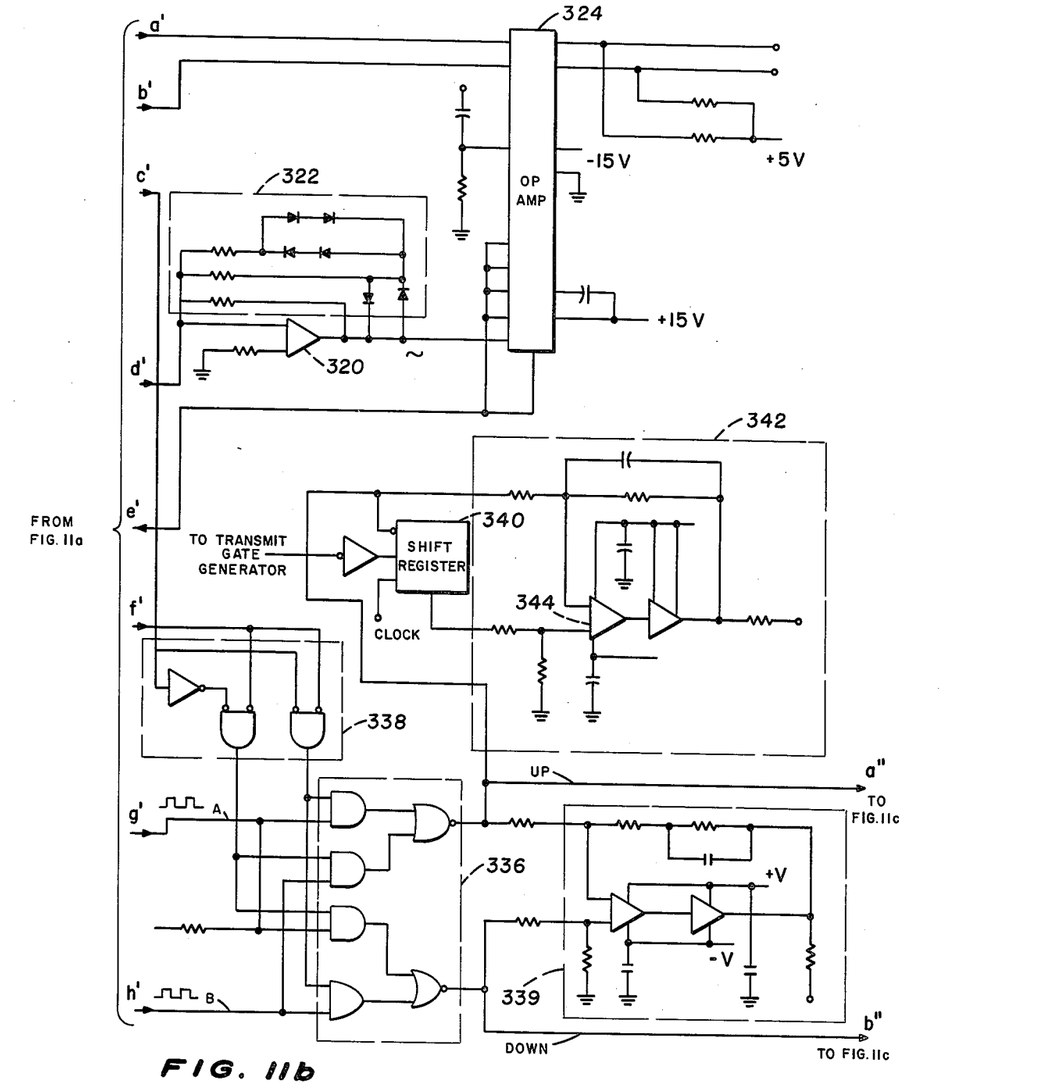
Figure 11C:
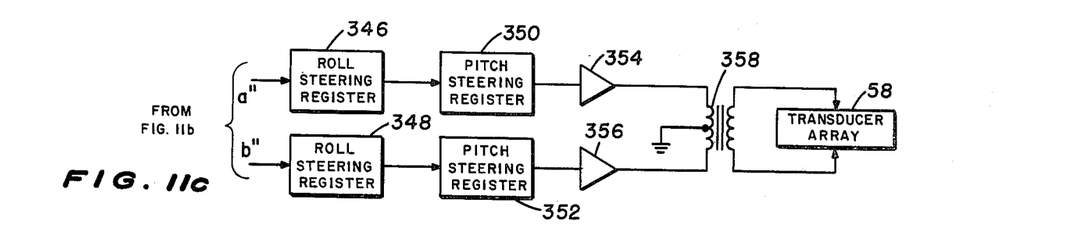
FIG. 11c shows circuitry which may be added in a two channel embodiment.

The preferred embodiment of the invention is single channel and does not include the circuitry of FIG. 11c. Instead, an approximation is used wherein the UP output of FIG. 11b is entered into a shift register 340 and circuitry 342. The UP output is thus delayed 180° and then inverted in inverter 344. The delayed, inverted signal is combined with the original UP output, thereby producing an approximation of the two channel signal at the output of circuitry 342. Referring back to FIG. 6, the approximation can be more readily understood if the lower (negative) portion of FIG. 6 is deleted and the upper portion is left intact. Viewing the carrier cycle (of FIG. 2) as one period, delay the upper portion by 180° (to the right in FIG. 6) and invert. Combining the upper portion with the delayed, inverted signal yields a close approximation of the ideal transducer drive depicted in FIG. 6. The approximation signal can thus be monitored and checked.

BEAMSTEERING

Figure 12:
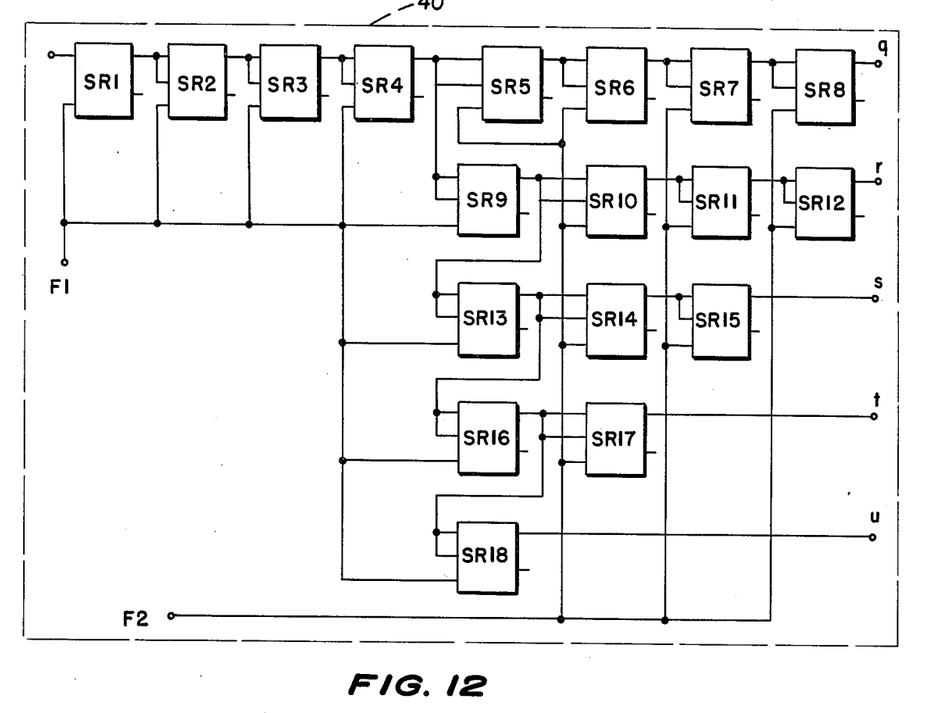
FIG. 12 is a logic element diagram of half of the roll beamsteering delay line of the present invention.
Figure 13:
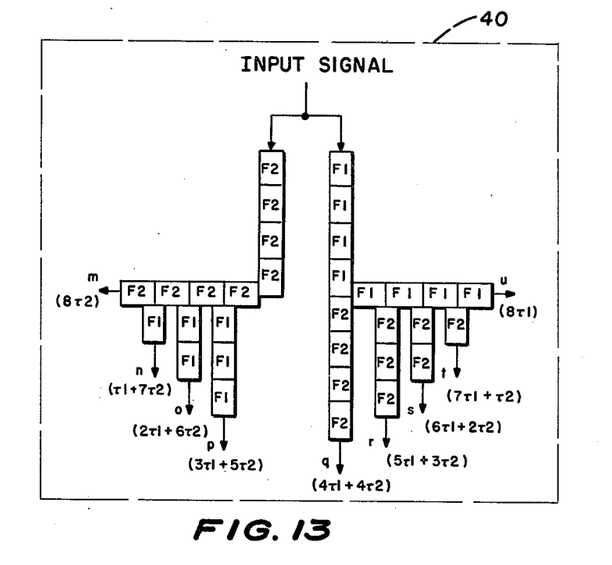
FIG. 13 is a block diagram of the roll delay line.
Figure 14:
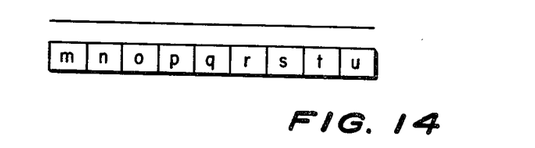
FIGS. 14, 15, and 16 are illustrations of wavefronts generated by an array element transducer, where successive elements are time delayed to effect roll beamsteering. The effects of varying time delays are shown in the figures.
Figure 15:
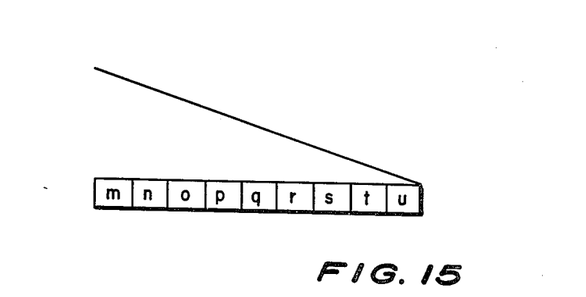
Figure 16:
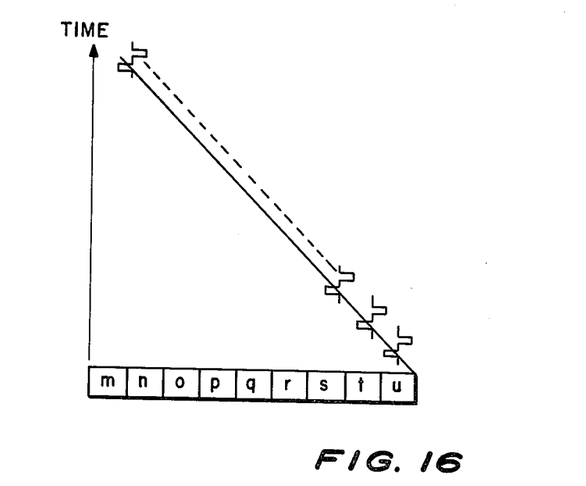

The beamsteering for the present single channel parametric scanning sonar system is all digital and is compatible with conventional array schemes. In FIG. 12 a detailed logic diagram of half of the roll delay line 40 (of FIG. 1b) is illustrated; FIG. 13 shows a block diagram of the roll delay line 40. In FIG. 12, a half of the roll delay line 40 is shown as a matrix of connected 8-bit shift registers SR1 through SR18 arranged as strings of serially connected shift registers wherein all the strings have an equal number ($\eta$) of shift registers. SR1 through SR4 and SR9, SR13, SR16, and SR18 are clocked at a frequency F1; all other shift registers (in FIG. 12) are clocked at a frequency F2 which is complementary, i.e. F2 clocks at periods when F1 does not. F1, for example, may clock at times 1, 2, 9, and 10 while F2 clocks at 3 through 8 and 11 through 16. By varying F1 and F2, the outputs from SR8, SR12, SR15, SR17, and SR18 will be incrementally delayed in digital delay line fashion with outputs q through u. As should be evident from FIG. 12, there are nine strings of shift registers which provide channels from the input signals of FIGS. 12 and 13 to the outputs m through u. One such string, comprised of shift registers SR1 through SR8 provides output at q after four F1 clocks and four F2 clocks. (shown as $4\tau 1$ and $4\tau 2$, respectively, in FIG. 13) are pulsed. The string which feeds the u output, as previously suggested, clocks all its shift registers SR1 through SR4, SR9, SR13, SR16, and SR18 at frequency F1. The output timing of the signals from the roll delay line 40 can be readily understood with reference to FIG. 13. Each block in FIG. 13 represents an 8-bit shift register being clocked at the indicated frequency F1 or F2 which have corresponding delay periods of $\tau 1$ and $\tau 2$. Referring again to FIG. 8 it can be seen that array 58 has nine vertical columns (referred to as M for the leftmost, N for next, . . . , and U for the rightmost) which can be steered about the roll axis. Columns M through U are indirectly connected (signals passing first through pitch beamsteering delay registers 44) to outputs m through u, respectively, of roll delay line 40. m, in FIG. 13, produces its output after a time $8\tau 2$; n produces its output after a time $\tau 1 + 7\tau 2$; o produces its outputs after a time $2\tau 1 + 6\tau 2$; ---; and u produces its output after a time $8\tau 1$. The signals exitting the roll delay line 40 via outputs m through u result in delays of the signal generated by array element columns M through U, respectively. The angle of beamsteering effected by the delay depends on the disparity between the clock frequencies F1 and F2. That is, if F1=F2 all outputs m through u produce signals simultaneously, the resultant effect on the sonar wavefront is shown in FIG. 14. If F1<F2, m will transmit its signal before n which will transmit before o and so on. The roll effect on the wavefront in such a case is shown in FIG. 15. If F1<F2 the effect on the wavefront shown in FIG. 16 results. FIG. 16 also illustrates the generating of signals at the various outputs m through u.

Figure 17:
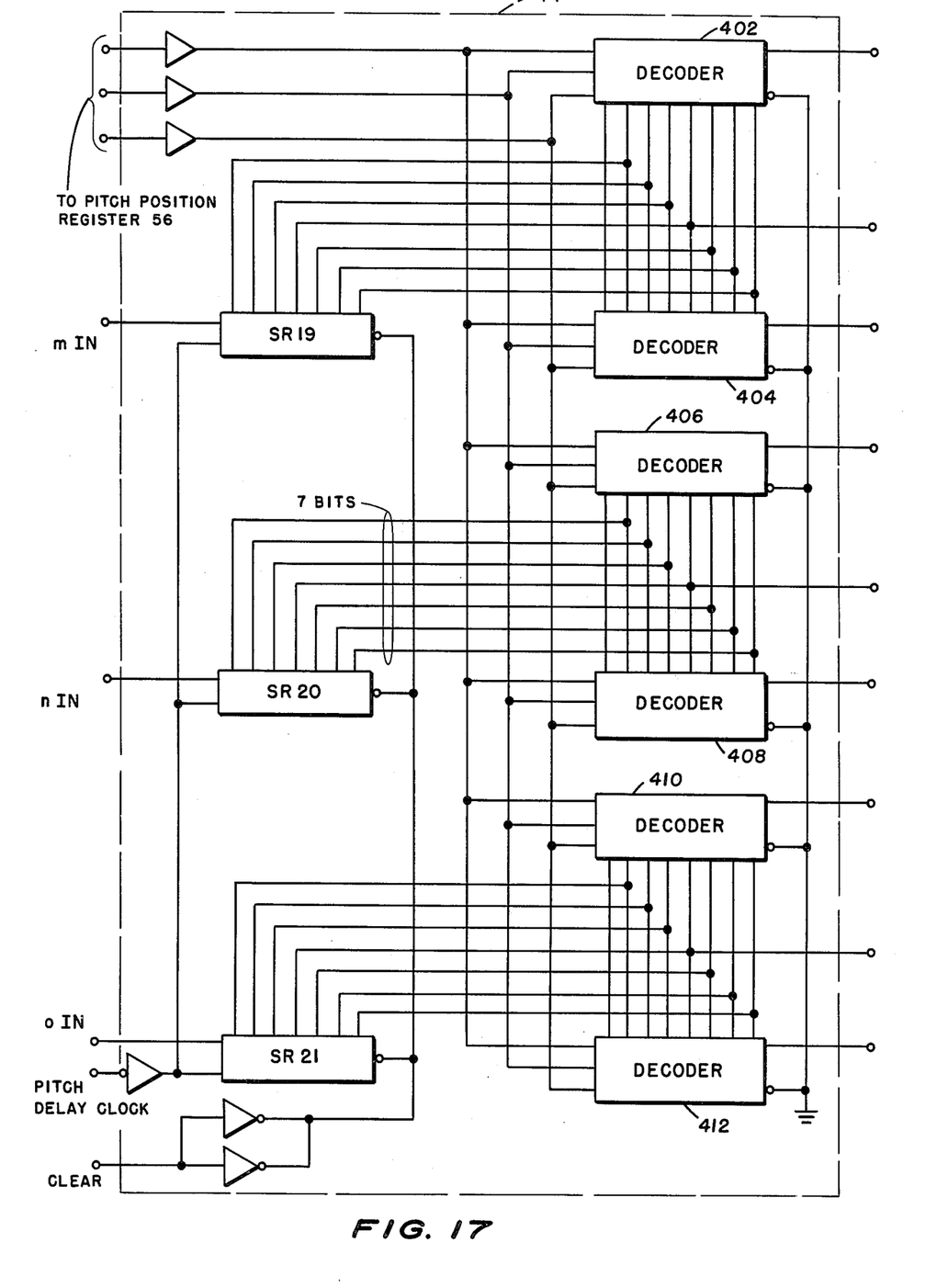
FIG. 17 shows a circuit diagram showing the elements used in pitch beamsteering.

In addition to roll beamsteering provision is made for pitch beamsteering by grouping the array elements into three horizontal rows I, II, and III which are selectively, sequentially delayed. As shown in FIG. 17, the pitch position is entered into the 1-of-8 decoders 402, 404, 406, 408, 410 and 412 of the pitch delay registers 44 (also shown in FIG. 1). At the same time, three of the nine roll beamsteering outputs are applied to shift registers SR19, SR20, and SR21, respectively, on the card illustrated in the figure. (There are three such identical cards to accommodate all nine roll beamsteering outputs). The contents of seven bits (if available) of each shift register, for example SR20, enter each of a pair of decoders 406 and 408. The center output of the shift register SR20 is passed to the power amplifier 50 through the end register 60 (of FIG. 1) as the center pitch row of transducers $\epsilon$. The outputs from the two decoders (406 and 408) will be identical pulse trains, one being advanced and the other retarded with respect to the center output, thereby effecting a pitch change relative to the initial pitch position.

Of course, an alternative arrangement like that for roll beamsteering can be employed for pitch beamsteering. That is, a shift register delay line may also be used to steer the sonar beam about the pitch axis. By providing a shift register network similar to that of FIG. 12 and connecting the sequential outputs to all elements of array 58 (in FIG. 8) along a horizontal line, steering about the pitch axis could be effected. Clocking the shift registers relating to pitch beamsteering at, preferably, complementary frequencies F3 and F4 (analogous to the frequencies F1 and F2 used in steering the beam about the roll axis), highly controllable and flexible multi-dimensional beamsteering is achieved. In most sonar applications, however, requirements for pitch beamsteering are less severe than for roll beamsteering and the simpler embodiment shown in FIG. 17 is generally adequate.

The roll and pitch delayed signals eventually enter the array which produces a properly steered beam.

It should, of course, be noted that the combined effect of roll beamsteering and pitch beamsteering results in a steering about an angle which is between the vertical and horizontal. Also, it should be understood that the pitch beamsteering can be performed in a manner similar to the roll beamsteering. The angular requirements for pitch which are usually less stringent, however, generally do not necessitate the wide angle, fine increment, novel method used for roll beamsteering in the present invention.

Various other modifications, adaptations and alterations are of course possible in light of the above teachings. Therefore, it should be understood at this time that within the scope of the appended claims the invention may be practiced otherwise than as specifically described.

What is claimed is:

1. A parametric scanning sonar system which generates a desired pattern of ensonification in a fluid medium comprising:

transducer means for producing sonar waves,
   means for driving the transducer means, said driving means comprising:
   a source of continuous wave energy comprising a selected modulation waveform generator and a carrier waveform generator, and
   means, connected to the source, for appropriately switching the energy from the source on and off, said switching means comprising a comparator means for receiving waveforms from the modulation waveform generator and the carrier waveform generator as inputs and for producing a pulse duration modulation composite transducer drive output when the magnitude of the carrier waveform exceeds the magnitude of the modulation waveform, and
   means for thereafter entering the composite transducer drive output waveform into the transducer means which transforms the composite transducer drive output into a sonar beam.

2. A parametric scanning sonar system, as in claim 1, further comprising:

means connected to the transducer drive means output for digitally steering the sonar beam in the roll direction, wherein said means for digitally steering in the roll direction comprises:
   a delay line comprised of a plurality of strings of shift registers, said strings being arranged as a sequence of strings, each string having the same number $\eta$ of shift registers in series, and means for clocking each shift register at either of two selected frequencies F1 or F2, such that the first string in the sequence clocks a plurality of its $\eta$ shift registers at frequency F1 with the remaining shift registers clocking at frequency F2, and such that each successive string in the sequence has one more of its $\eta$ shift registers clocked at frequency F2 and one less clocked at frequency F1.

3. A parametric scanning sonar system as in claim 1, wherein the modulation waveform generator produces two periodic modulation waveform signals which are the inverse of each other and wherein the comparator means produces a separate pulse output for each modulation waveform signal.

4. A parametric scanning sonar system as in claim 3, wherein the switching means further comprises:
phase select means for selectively gating one pulse output during odd and the other pulse output during even half-cycles of the modulation waveform to produce a positive portion of the composite transducer drive output, and for selectively gating the one pulse output during even and the other pulse output during odd half cycles of the modulation waveform to produce a negative portion of the composite transducer drive output.

5. A parametric scanning sonar system as in claim 3, wherein the switching means further comprises:
phase select means for selectively gating one pulse output during odd and the other output pulse during even half-cycles of the modulation waveform to produce a positive (negative) portion of the transducer drive output, and
means, connected to the phase select means, for delaying by 180° and for inverting the positive (negative) portion to produce a negative (positive) portion of the transducer drive output, and
means connected for receiving and combining the positive (negative) portion with the delayed and inverted negative (positive) portion yielding a composite transducer drive output.

6. A parametric scanning sonar system as in claim 3, wherein the modulation waveform generator comprises:
means for generating a single-component periodic modulated waveform,
means, connected to the single-component periodic modulated waveform generating means, for rectifying alternate half-cycles of the single-component periodic waveform, and
means, connected to the rectifying means, for inverting the rectified waveform, such that the uninverted rectified waveform and the inverted rectified waveform represent the two modulation waveform signals which are symmetric about a line defining zero amplitude.

7. A parametric scanning sonar system as in claim 2, wherein the two clock frequencies F1 and F2 are equal.

8. A parametric scanning sonar system as in claim 2, further comprising pitch delay elements which combine the delay effected in the roll direction to the delay desired in the pitch direction.

9. A parametric scanning sonar system as in claim 2, wherein the clocking means generates pulses at each frequency F1 or F2 which are complementary with respect to the pulses generated at the other frequency.

10. A parametric scanning sonar system as in claim 2, wherein the means for digitally steering the sonar beam further comprises:
means for determining the current steered position, and
means, receiving the current steered position as an input and connected to the clocking means, for controlling the steering and stopping the steering when a given limit is reached.

11. A parametric scanning sonar system as in claim 10, wherein the current steered position determining means comprises:
a position register containing an entered limit value,
a rate register containing an entered value reflecting the rate at which the position is to be steered,
a rate multiplier connected to the rate register,
a rate counter connected to the rate multiplier, and
means for adding the rate counter output with the position register contents to produce a current roll position value.

12. A parametric scanning sonar system as in claim 11, wherein the steering controlling and stopping means comprises:
an inverter connected to the position register,
a comparator, connected to the inverter and the adding means, which compares the current position with the limit value and generates a stop signal when the current position reaches the limit, and
gating means, activated by the stop signal and connected to the delay line, for inhibiting input to the delay line when the limit is reached.

13. A parametric scanning sonar system as in claim 1, wherein the selected modulation waveform generator comprises:
means for generating a plurality of distinct waveforms, and
means, connected to the distinct waveform generating means, for selecting one of the plurality of waveforms to be employed in producing the composite transducer drive output.

14. A parametric scanning sonar system as in claim 13, further comprising:
means, connected to the selected modulation waveform generator, for initializing the frequency of the modulation waveform and for varying the frequency of the modulation waveform.

15. A parametric scanning sonar system as in claim 14, wherein the frequency initializing and varying means comprises:
a data select switch for selecting data values,
a buffer register,
a multi-position word select switch,
a word address control, which is the connecting link between the buffer register and the word select switch,
a modulation frequency register and
a modulation rate register both connected to the buffer register and word address control,
a clock counter,
a first rate multiplier, receiving the modulation rate register output as input, clocked by the clock counter,
an up/down counter, receiving the modulation frequency register output and first multiplier output as inputs, and
a second rate multiplier receiving the up/down counter output as input, wherein the position of the word select switch, by means of the word address control, determines into which of the registers the data values are to be entered via the buffer register and wherein the data value in the modulation rate register is changed into pulses by the first rate multiplier which then enters the pulses into the up/down counter to effect the desired incrementing or decrementing of the data received from the modulation frequency register, after which the up/down counter output enters the second rate multiplier whose pulse output enters the selected modulation waveform generator.

16. A parametric scanning sonar system as in claim 15, further comprising:

means, connected to receive input from the buffer register and word address control, for selecting pulse repetition frequency (prf) and pulsewidth of the composite transducer drive output.

17. A parametric scanning sonar system as in claim 16, wherein the prf and pulsewidth setting means further comprises:

means for maintaining a prf length more than the pulsewidth selected.

18. A method for digitally steering a sonar beam, by means of a transducer array comprised of a plurality of elements, comprising the steps of:

generating a transducer drive output signal;

entering the generated transducer drive output signal into a first plurality of shift register strings arranged as an ordered sequence of strings, where each string comprises an equal number $\eta$ of shift registers connected in series, producing the transducer drive output signal at the output of the $\eta$th shift register of the first string after $(y) \times (p)$ clock pulses at frequency F1 and $(y) \times (\eta - p)$ clock pulses at frequency F2, y representing bits per shift register, and producing the transducer drive output signal at the $\eta$th shift register of successive strings in the sequence after an appropriate number of clock pulses at frequency F1 and at frequency F2, and feeding the transducer drive output signal at the output of the $\eta$th shift register of each string in the sequence to corresponding elements in the transducer array.

19. A method for digitally steering a sonar beam as in claim 18, further comprising the steps of:

generating a basic clock frequency F, and extracting clocks at frequencies F1 and F2 from the basic clock frequency F such that F1+F2=F.

20. A method as in claim 18, comprising the further steps of:

defining the elements of the transducer array as a matrix of horizontal rows of elements and of vertical columns of elements, and connecting the outputs from each successive string in the first plurality of strings to successive columns of transducer array elements, thereby effecting roll beamsteering.

21. A method for digitally steering a sonar beam by means of a transducer array comprised of a plurality of elements, as in claim 20, comprising the further steps of:

entering the generated transducer drive output signal into a second plurality of shift register strings arranged in an ordered sequence, where each string comprises an equal number $\mu$ of shift registers connected in series, clocking a plurality t of shift registers in one string at a frequency F3 and the remaining $(\mu - t)$ shift registers at a frequency F4, and clocking one more shift register at frequency F3 and one less shift register at frequency F4 for each successive string in the ordered sequence.

22. A method as in claim 21, comprising the further steps of:

feeding the transducer drive output signal at the output of the $\mu$th shift register of the first string to selected elements of the transducer array after $(z) \times (t)$ clock pulses at frequency F3 and $(z) \times (\mu - t)$ clock pulses at frequency F4, z representing bits per shift register, and feeding the transducer drive output signal at the output of the $\mu$th shift register of each successive string to corresponding elements of the transducer array after the appropriate number of clock pulses at the frequencies F3 and F4 are generated.

23. A method as in claim 22, comprising the further step of:

connecting the outputs from successive strings of the second plurality of strings to successive rows of transducer array elements, thereby effecting pitch beamsteering.

24. A method as in claim 23, comprising the futher step of:

combining the output sequencing effects emanating from the roll beamsteering and from the pitch beamsteering to produce an appropriate transducer drive output signal delay for each transducer array element.

* * * * *